(12) United States Patent
Ohira

(10) Patent No.: US 8,928,938 B2
(45) Date of Patent: Jan. 6, 2015

(54) IMAGE FORMING APPARATUS, IMAGE FORMING METHOD AND RECORDING MEDIUM

(71) Applicant: Sharp Kabushiki Kaisha, Osaka (JP)

(72) Inventor: Masakazu Ohira, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 86 days.

(21) Appl. No.: 13/633,969

(22) Filed: Oct. 3, 2012

(65) Prior Publication Data

US 2013/0083335 A1    Apr. 4, 2013

(30) Foreign Application Priority Data

Oct. 4, 2011    (JP) .................................. 2011-220435

(51) Int. Cl.
| | | |
|---|---|---|
| G06F 15/00 | (2006.01) | |
| H04N 1/407 | (2006.01) | |
| G03G 15/00 | (2006.01) | |

(52) U.S. Cl.
CPC .......... *H04N 1/4078* (2013.01); *G03G 15/502* (2013.01); *G03G 15/5029* (2013.01); *G03G 2215/00569* (2013.01)
USPC .............. 358/1.9; 358/504; 358/518; 358/3.1

(58) Field of Classification Search
None
See application file for complete search history.

(56) References Cited

U.S. PATENT DOCUMENTS

| | | | | |
|---|---|---|---|---|
| 5,797,690 | A  * | 8/1998 | Iwamura et al. ............... | 358/1.8 |
| 6,381,036 | B1 * | 4/2002 | Olson ............................ | 358/1.9 |
| 8,305,664 | B2 * | 11/2012 | Yasunaga ...................... | 358/518 |
| 2005/0206928 | A1 * | 9/2005 | Itagaki ........................... | 358/1.9 |
| 2007/0097439 | A1 * | 5/2007 | Yamada ......................... | 358/3.1 |
| 2008/0130061 | A1 * | 6/2008 | Nakase et al. ................ | 358/406 |
| 2009/0059322 | A1 * | 3/2009 | Vanduyn et al. .............. | 358/504 |
| 2009/0103122 | A1 * | 4/2009 | Horita et al. .................. | 358/1.9 |
| 2009/0317149 | A1 * | 12/2009 | Takura .......................... | 399/301 |
| 2010/0110498 | A1 | 5/2010 | Sakaue | |
| 2010/0177367 | A1 * | 7/2010 | Komatsu et al. .............. | 358/518 |
| 2010/0214581 | A1 * | 8/2010 | Shiraki et al. ................ | 358/1.9 |
| 2012/0075645 | A1 * | 3/2012 | Katayama et al. ............ | 358/1.9 |

FOREIGN PATENT DOCUMENTS

| | | |
|---|---|---|
| JP | 06-295110 | 10/1994 |
| JP | 3405055 | 3/2003 |
| JP | 2004-109483 A | 4/2004 |
| JP | 2010-109753 A | 5/2010 |
| JP | 2010-173302 A | 8/2010 |

\* cited by examiner

*Primary Examiner* — Kimberly A Williams
(74) *Attorney, Agent, or Firm* — Renner, Otto, Boisselle & Sklar, LLP

(57) ABSTRACT

Provided is an image forming apparatus including an image forming section for forming a test image including a plurality of patterns in which at least one pattern is more easily affected by a variation factor for density than another pattern, an accepting section for accepting an amount of adjustment for density, and an adjusting section for adjusting density of an image to be formed by the image forming section based on the amount of adjustment for density accepted by the accepting section.

15 Claims, 16 Drawing Sheets

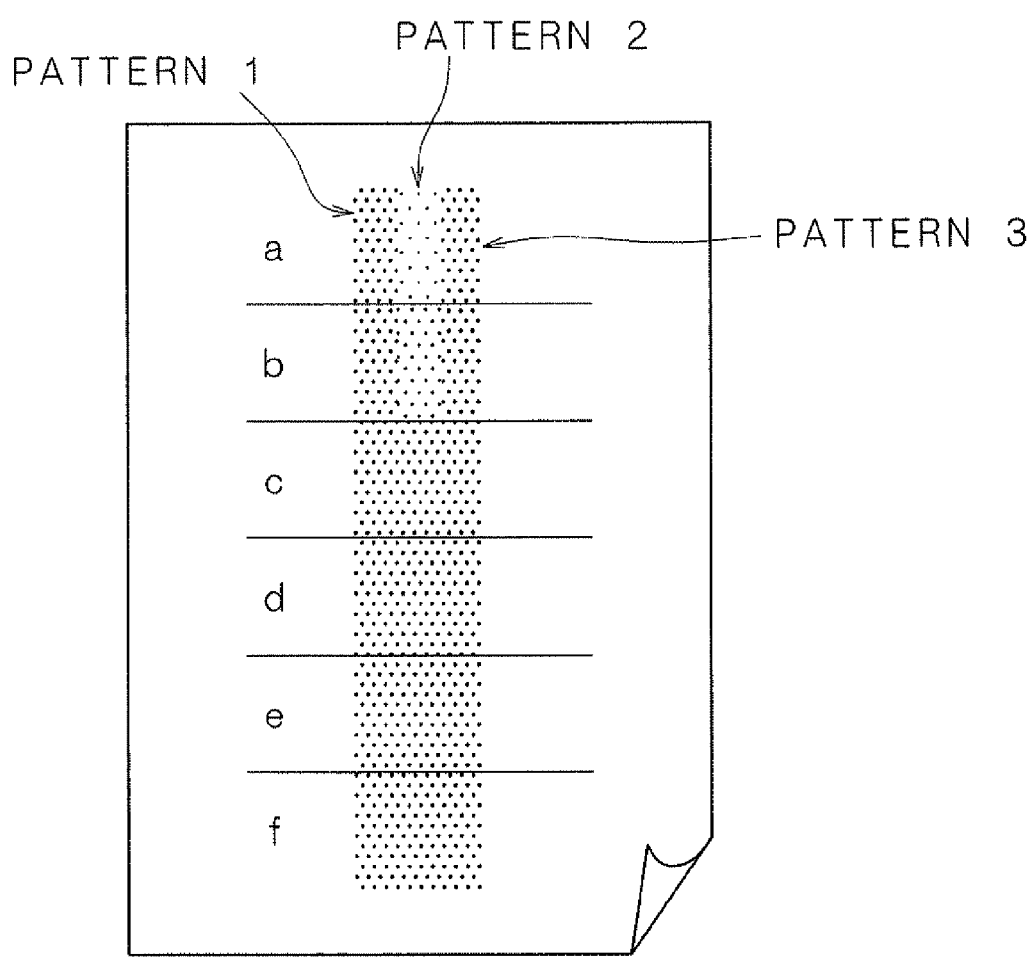

FIG. 15

|   | DENSITY 1 | DENSITY 2 | DENSITY 3 |
|---|---|---|---|
| a | +3 ▲▼ | +1 ▲▼ | +4 ▲▼ |
| b | +2 ▲▼ | 0 ▲▼ | +3 ▲▼ |
| c | 0 ▲▼ | 0 ▲▼ | +2 ▲▼ |
| d | 0 ▲▼ | 0 ▲▼ | 0 ▲▼ |
| e | 0 ▲▼ | 0 ▲▼ | 0 ▲▼ |
| f | 0 ▲▼ | 0 ▲▼ | 0 ▲▼ |

IMAGE FORMING APPARATUS, IMAGE FORMING METHOD AND RECORDING MEDIUM

CROSS-REFERENCE TO RELATED APPLICATIONS

This Nonprovisional application claims priority under 35 U.S.C. §119(a) on Patent Application No. 2011-220435 filed in Japan on Oct. 4, 2011, the entire contents of which are hereby incorporated by reference.

FIELD

The present invention relates to an image forming apparatus, an image forming method and a recording medium that are able to form an image with uniform density.

BACKGROUND

In recent years, an image forming apparatus such as a copying machine and a printer, in which an electrophotographic process is employed, has widely been used. Such an image forming apparatus includes, for example, a photoreceptor drum, a charging unit for charging the photoreceptor drum at a predetermined electrical potential, a laser scanning unit for emitting laser light in accordance with image data accepted from the outside and generating an electrostatic latent image on the photoreceptor drum, a developing unit for supplying toner to the electrostatic latent image formed on the surface of the photoreceptor drum so as to visualize the image, and a transferring unit for transferring the toner image formed on the surface of the photoreceptor drum onto a paper. The image forming apparatus allows the user to form a desired image on a recording medium by the electrophotographic system.

In such an image forming apparatus, due to non-uniformity in a charging characteristic depending on a position of the photoreceptor drum, an amount of laser light emitted from the laser scanning unit, a toner mass per unit area in the developing unit, and a difference in distance between the developing unit and the photoreceptor drum, for example, unevenness occurs in density for the image formed on, for example, a recording medium, which may further cause non-uniformity in density depending on a forming position. If such non-uniformity in the density is not resolved, the density of an image may be different for each forming position even if the image is formed on a recording medium based on image data which is to be formed with uniform density.

In order to resolve non-uniformity in density depending on a forming position, Japanese Patent No. 3405055 discloses a method of correcting image data by printing a test patch, performing colorimetry on the printed test patch and obtaining an amount of correction for each position to correct image data.

SUMMARY

The method disclosed in Japanese Patent No. 3405055, however, requires a device for the colorimetry in order to correct non-uniformity in density for each position, presenting such a problem that the correction cannot be made without the device for colorimetry.

The present invention has been devised in view of the above circumstances and has an object to provide an image forming apparatus, an image forming method and a recording medium that can easily detect and adjust non-uniformity in density without using a complicated device such as a colorimetric device.

An image forming apparatus according to the present invention includes: an image forming section for forming a test image including a plurality of patterns in which at least one of the patterns is more easily affected by a variation factor for density than another one of the patterns; an accepting section for accepting an amount of adjustment for density; and an adjusting section for adjusting density of an image to be formed by the image forming section based on the amount of adjustment for density accepted by the accepting section.

According to an aspect of the invention, the image forming section forms a test image including a plurality of patterns, in which at least one pattern is more easily affected by a variation factor for density than another pattern. The accepting section accepts the amount of adjustment for the density. The adjusting section adjusts the density of an image to be formed by the image forming section based on the accepted amount of adjustment for density. Accordingly, non-uniformity in density caused at the image forming apparatus can be detected with a simple method such as eye observation without using a complicated device, while an image to be formed can appropriately be adjusted for its density so as to form an image having uniform density.

The image forming apparatus according to the present invention is characterized in that the above-described at least one pattern is a dispersed dot dither pattern or an error diffusion pattern, and the above-described another pattern is at least one of a cluster dot dither pattern and a line screen pattern.

According to an aspect of the invention, at least one of the plurality of patterns forming a test chart is a dispersed dot dither pattern or an error diffusion pattern, while another pattern of them is at least one of a cluster dot dither pattern and a line screen pattern. Thus, the test chart can easily be formed by a halftone pattern which has conventionally been used. Since the dispersed dot dither pattern and the error diffusion pattern are easily affected by a variation factor for density whereas the cluster dot dither pattern and the line screen pattern are not easily affected by a variation factor for density, it is easy to detect unevenness in density and to adjust the density of an image, by comparing the density for these patterns.

The image forming apparatus according to the present invention is characterized in that the adjusting section adjusts density such that a difference in density between patterns in the formed test image becomes smaller.

According to an aspect of the invention, the adjusting section adjusts density such that a difference in density between patterns in the formed test image becomes smaller. This can resolve non-uniformity in density with a simple method.

An image forming method according to the present invention includes: an image forming step of forming a test image including a plurality of patterns in which at least one of the patterns is more easily affected by a variation factor for density than another one of the patterns; an accepting step of accepting an amount of adjustment for density; and an adjusting step of adjusting density of an image to be formed based on the accepted amount of adjustment for density.

According to an aspect of the invention, a test image is formed, including a plurality of patterns in which at least one pattern is more easily affected by a variation factor for density than another pattern. An amount of adjustment for density is accepted, and the density of an image to be formed is adjusted based on the accepted amount of adjustment. This makes it possible to detect non-uniformity in density caused at the image forming apparatus with a simple method such as eye observation and without the use of a complicated device. Thus, the density of an image to be formed can appropriately be adjusted, and an image with a uniform density can be formed.

The image forming method according to the present invention is characterized in that the adjusting step adjusts density such that a difference in density between patterns in the formed test image becomes smaller.

According to an aspect of the invention, non-uniformity in density can be resolved with a simple method by adjusting the density to reduce the difference in density between patterns in the formed test image.

A computer program according to the present invention is characterized by causing a computer to execute the steps of: forming a test image including a plurality of patterns in which at least one of the patterns is more easily affected by a variation factor for density than another one of the patterns; accepting an amount of adjustment for density; and adjusting density of an image to be formed based on the accepted amount of adjustment for density.

According to an aspect of the invention, a test image is formed, including a plurality of patterns in which at least one pattern is more easily affected by a variation factor for density than another pattern. An amount of adjustment for the density is accepted, and the density of an image to be formed is adjusted based on the accepted amount of adjustment. This makes it possible to detect non-uniformity in density caused at the image forming apparatus with a simple method such as eye observation and without the use of a complicated device. Thus, the density of an image to be formed can appropriately be adjusted, and an image with uniform density can be formed.

A non-transitory computer-readable recording medium according to the present invention is characterized in that the above-described computer program according to the invention is recorded therein.

According to an aspect of the invention, the computer program described above is recorded in the recording medium. The computer reads out a computer program from the recording medium, to realize the image forming apparatus and the image forming method as described earlier.

According to the present invention, a test image is formed, including a plurality of patterns in which at least one pattern is more easily affected by a variation factor for density than another pattern. The density of the image to be formed is adjusted based on the amount of correction for density on the basis of the formed test image. Thus, non-uniformity in density caused at the image forming apparatus can be detected with a simple method such as eye observation and without the use of a complicated device. Thus, the density of an image to be formed can appropriately be adjusted, and an image with uniform density can be formed.

The above and further objects and features of the invention will more fully be apparent from the following detailed description with accompanying drawings.

BRIEF DESCRIPTION OF DRAWINGS

FIG. 13 illustrates an example of a test chart outputted from an image output apparatus in the digital multi-function peripheral according to Variation 1 of the present invention, FIG. 15 illustrates an example of a correction amount input screen displayed on a display device in the digital multi-function peripheral according to Variation 2 of the present invention.

DESCRIPTION OF EMBODIMENTS

An image forming apparatus, an image forming method, a computer program and a recording medium according to the present invention will specifically be described below, with reference to the drawings, in forms applied to a digital multi-function peripheral having a copying function, a printing function and the like.

Embodiment 1

Figure 1:
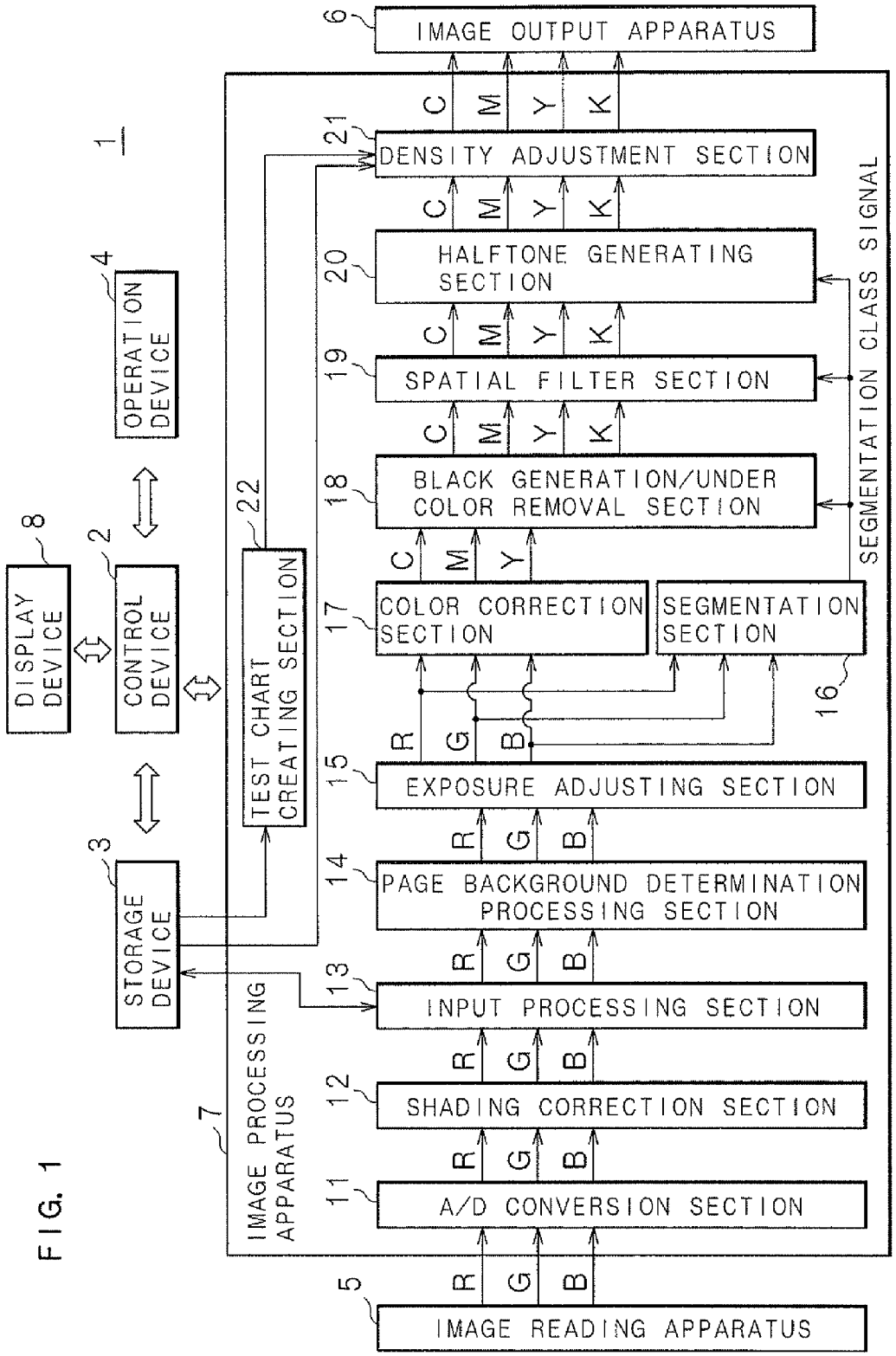
FIG. 1 is a block diagram illustrating a configuration example of a digital multi-function peripheral according to Embodiment 1 of the present invention.

FIG. 1 is a block diagram illustrating a configuration example of a digital multi-function peripheral according to Embodiment 1 of the present invention. A digital multi-function peripheral 1 according to Embodiment 1 includes a control device 2, a storage device 3, an operation device 4, an image reading apparatus 5, an image output apparatus 6, an image processing apparatus 7 and a display device 8, and implements, as a whole, a digital duplicating function, a copying function, a printing function, a facsimile transmitting function, a scanning function and so forth according to the present invention.

The control device 2 is, for example, a CPU (Central Processing Unit), which loads a predetermined program from the storage device 3 as required and executes the loaded program, to cause the digital multi-function peripheral 1 to operate as an image forming apparatus according to the present invention.

The storage device 3 is, for example, a non-volatile semiconductor memory, and stores therein a control program used for controlling each hardware unit by the control device 2, various types of image data processed by the image processing apparatus 7, an amount of adjustment used for adjusting density of an image to be outputted from the image output apparatus 6, several kinds of pattern data configuring a test chart (test image) for detecting non-uniformity in density, and so forth.

The operation device 4 includes, for example, function buttons such as "fax," "copy," "print" and "mail" for important functions of the digital multi-function peripheral 1, numeric keys, and an enter key for determining accepted instructions.

The image reading apparatus 5 includes, for example, a light source for directing light to an original document to be read, an image sensor such as a CCD (Charge Coupled Device), and optically reads image data of the original document. The image reading apparatus 5 focuses an image of reflected light from the original document, which is set at a predetermined reading position, to output an analog RGB (R:Red, G:Green, B:Blue) electric signal. The analog RGB electric signal outputted from the image reading apparatus 5 is inputted to the image processing apparatus 7.

The image output apparatus 6 includes, for example, a photoreceptor drum, a charging unit for charging the photoreceptor drum at a predetermined electrical potential, a laser scanning unit for emitting laser light in response to image data accepted from the outside and generating an electrostatic latent image on the photoreceptor drum, a developing unit for supplying toner to the electrostatic latent image formed on the surface of the photoreceptor drum to visualize the image, and a transferring unit for transferring a toner image formed on the photoreceptor drum onto a recording medium, and forms an image on a recording medium such as a recording paper, an OHP film and the like based on image data from the image processing apparatus 7. Note that the image output apparatus 6 may form an image by an electrophotographic method using a laser scanning unit or may alternatively form an image by an inkjet method, a thermal transfer method, a sublimation method or the like.

The image processing apparatus 7, for example, generates digital image data based on an analog signal inputted from the image reading apparatus 5, or reads image data stored in the storage device 3, to adjust the density for these pieces of image data. The image data for output, which has been adjusted, is outputted to the image output apparatus 6 or to a communication device (not shown). The image processing apparatus 7 includes, as shown in FIG. 1, an A/D conversion section 11, a shading correction section 12, an input processing section 13, a page background determination processing section 14, an exposure adjusting section 15, a segmentation section 16, a color correction section 17, black generation/under color removal section 18, a spacial filter section 19, a halftone generating section 20, a density adjustment section 21 and a test chart creating section 22.

The analog signal for image data from the image reading apparatus 5 is transmitted in the image processing apparatus 7 through the A/D conversion section 11, the shading correction section 12, the input processing section 13, the page background determination processing section 14, the exposure adjusting section 15, the segmentation section 16, the color correction section 17, the black generation/under color removal section 18, the spatial filter section 19, the halftone generating section 20 and the density adjustment section 21 in this order (in the direction of arrows), and is outputted to the image output apparatus 6 as CMYK digital color data.

The A/D conversion unit 11 is to convert an analog RGB signal from the image reading apparatus 5 into a digital signal. The shading correction section 12 performs processing of removing various kinds of distortion to be generated in an illuminating system, an image focusing system and an image sensing system of the image reading apparatus 5, on the digital RGB signal outputted from the A/D conversion section 11. The input processing section 13 performs gamma correction on each RGB signal from which various kinds of distortion are removed by the shading correction section 12.

The page background determination processing section 14, for example, determines whether or not the value of density for a page background is larger than a threshold, to determine a page background region of the image data obtained through the image reading apparatus 5. When the determination for the page background region is performed, first, the image data inputted as the RGB signal is separated into a luminance signal and a chrominance signal by, for example, converting the data into the luminance signal using the formula below.

$$Yj = 0.30 Rj + 0.59 Gj + 0.11 Bj$$

Figure 2:
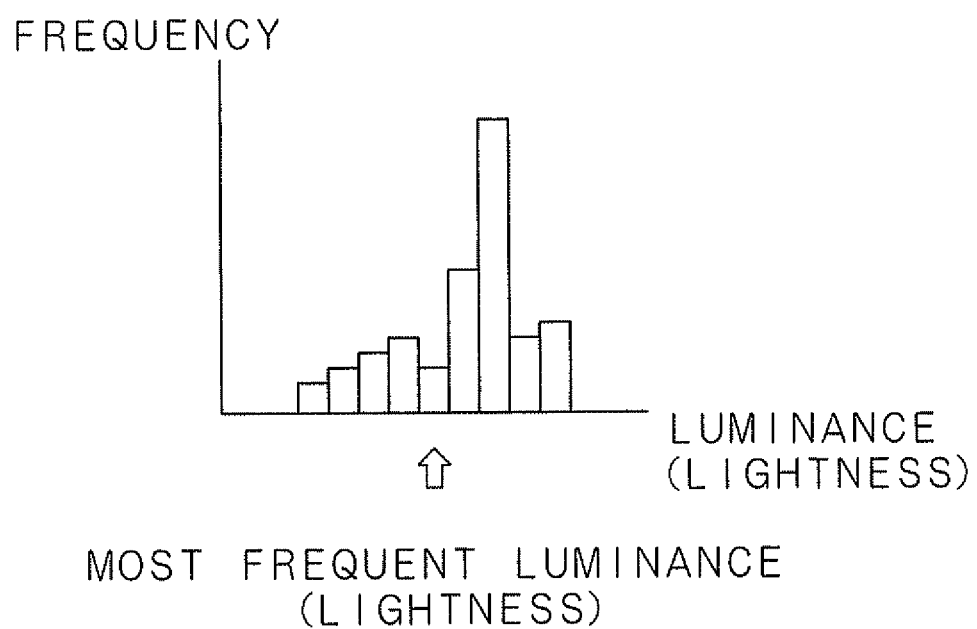
FIG. 2 is an explanatory view illustrating a process of detecting a page background region by a page background determination processing section in the digital multi-function peripheral according to Embodiment 1 of the present invention.

Here, Yj is a luminance signal for each pixel, while Rj, Gj and Bj are color components for each pixel. Alternatively, a lightness signal may be obtained by converting the data into a uniform color space including, for example, a CIEL* a* b* signal (CIE: Commision Internationale de l'éclairage, L*: lightness, a* b*: chrominance). FIG. 2 is an explanatory view illustrating a process of determining a page background region by the page background determination processing section 14 in the digital multi-function peripheral 1 according to Embodiment 1 of the present invention. The page background determination processing section 14 creates a histogram as shown in FIG. 2 using the entire image based on the luminance signal or the lightness signal obtained as described above. Assuming that the region with the most frequent luminance (lightness) is the page background region, the page background determination processing section 14 compares the luminance (lightness) Yf obtained here with a preset threshold th, and determines that the density value of the page background is larger than the threshold when Yf<th, whereas it is determined that such a density value is equal to or less than the predetermined density value otherwise.

Figure 3:
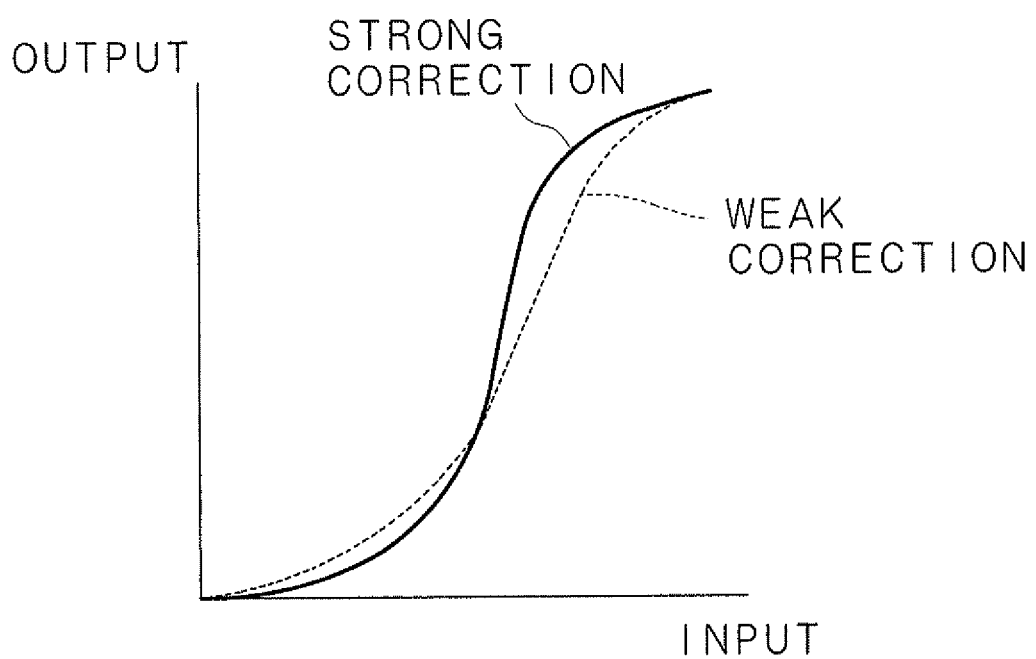
FIG. 3 illustrates an example of LUT (Look Up Table) used for exposure adjustment by an exposure adjusting section in the digital multi-function peripheral according to Embodiment 1 of the present invention.

If the user selects to adjust the exposure, the exposure adjusting section 15 switches (selects) an allocation table (LUT: Look Up Table) for output luminance with respect to a plurality of preset input luminance to correct the RGB value of an input image and to remove the page background. FIG. 3 illustrates an example of LUT used for exposure adjustment performed by the exposure adjusting section 15 in the digital multi-function peripheral 1 according to Embodiment 1 of the present invention. As for the process of removing a page background, it is also possible to detect a page background by the page background determination processing section 14 and to remove the page background based on the detected page background level. Here, no processing is performed by the exposure adjusting section 15.

The segmentation section 16 is to determine which one of a text region, a halftone dot region, a photograph region (continuous tone region) and the like each pixel of the input image data belongs to, and segments the pixels into these regions. The segmentation section 16 is configured to output a segmentation class signal indicating a region each pixel belongs to, based on the result of segmentation, to the black generation/under color removal section 18, the spacial filter section 19 and the halftone generating section 20.

The color correction section 17 generates a CMY (C: Cyan, M: Magenta, y: Yellow) signal which is complementary colors of the RGB signal, while removing color impurity caused by the spectral characteristic of the CMY color material including unnecessary absorbing components in order to improve a color reproducibility.

The black generation/under color removal section 18 performs processing of black generation in which a black (K) signal is generated from the three-color signal of CMY obtained after the color correction, and processing of generating a new CMY signal by subtracting the K signal obtained by the black generation from the original CMY signal, to convert the three-color CMY signal into a four-color CMYK signal.

The spatial filter section 19 performs a spacial filtering process on the image data of the CMYK signal inputted from the black generation/under color removal section 18 by a digital filter based on the segmentation class signal and corrects a spacial frequency characteristic to prevent blurring and deterioration in granularity in the output image.

The halftone generating section 20 performs, for example, tone reproduction processing on the image data of the CMYK signal based on the segmentation class signal. The tone reproduction processing is to finally segment an image into pixels and to reproduce the respective tones. For example, the spacial filtering section 19 performs an edge enhancement process in the spatial filter processing on a region segmented into a text by the segmentation section 16 in order to improve the reproducibility of, especially, a black text or a color text, so that the high frequency components of the region can be more enhanced. At the same time, the halftone generating section 20 selects binarization or multi-level dithering processing on a screen with high resolution which is suitable for reproduction of high frequency components.

The density adjustment section 21 performs an adjusting process for density on various types of image data for output, including, for example, CMYK image data outputted from the halftone generating section 20 and various types of image data read out from the storage device 3, based on the amount of adjustment stored in the storage device 3. The adjusted image data is outputted to the image output apparatus 6.

The test chart creating section 22 is configured to read out data of a pre-stored pattern from the storage device 3, to generate test chart data regarding a test chart for detecting non-uniformity in density of an image, and to output the data to the density adjustment section 21.

The display device 8 is, for example, a liquid-crystal panel, which displays information to be given to the user, a preview screen, an input screen for the amount of adjustment (hereinafter also referred to as "adjustment amount input screen") described later. Upon preview, the color correction section 17 converts the RGB signal into a R'G'B' signal, performs a spacial filtering process as required, performs gamma correction and displays the signals, based on the display characteristic of the display device 8. Here, no processing is performed by the black generation/under color removal section 18, the halftone generating section 20 and the density adjustment section 21. Note that the display device 8 may be a touch display (screen) also serving as a part of the operation device 4.

Test charts used in the present embodiment will be described below with reference to FIGS. 4 through 9. The test chart according to the present invention includes a pattern which is easily affected by a variation factor for density and a pattern which is not easily affected by a variation factor for density. In Embodiment 1, a dispersed dot dither pattern in which dots are dispersed is used as the pattern easily affected by a variation factor for density, while a cluster dot dither pattern in which dots are concentrated is used as the pattern not easily affected by a variation factor for density.

Figure 4A:
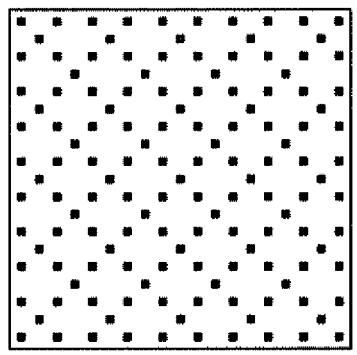
FIG. 4A illustrates an example of a pattern for configuring a test chart used in the digital multi-function peripheral according to Embodiment 1 of the present invention.
Figure 4B:
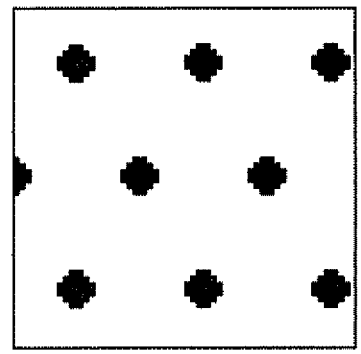
FIG. 4B illustrates an example of a pattern for configuring a test chart used in the digital multi-function peripheral according to Embodiment 1 of the present invention.

Each of FIGS. 4A and 4B illustrates an example of a pattern for configuring a test chart used in the digital multi-function peripheral according to Embodiment 1 of the present invention. FIGS. 4A and 4B respectively show a dispersed dot dither pattern (hereinafter simply referred to as a "dispersed dot pattern") which is a pattern easily affected by a variation factor for density, and a cluster dot dither pattern (hereinafter simply referred to as a "cluster dot pattern") which is a pattern not easily affected by a variation factor for density. As shown in FIG. 4A, the dispersed dot pattern is a halftone pattern designed such that dots are sparsely positioned and tends to show changes in density because the arrangement of dots varies when the characteristic of the photoreceptor drum or the amount of laser light changes. Moreover, as shown in FIG. 4B, the cluster dot pattern is a halftone pattern formed with a dot collective including a plurality of clustered dots, which is designed such that a part of the dots are closely positioned. Though a part of the dots forming the cluster dot pattern changes, the density hardly changes in the entire pattern. In other words, the dispersed dot pattern is more easily affected by a variation factor for density compared to the cluster dot pattern and relatively has a high sensitivity for detecting a variation in density.

Since the dispersed dot pattern tends to show variations in density, only the dispersed dot pattern may be used for a test chart. It is, however, also possible to output a cluster dot pattern together with the dispersed dot pattern so as to easily detect a variation in density on the basis of the cluster dot pattern. In the present embodiment, a test chart is formed with a dispersed dot pattern and a cluster dot pattern that appear to have the same density. For example, the test chart is formed with a band-like pattern with the entire image extends along the main scanning direction while the dispersed dot pattern and cluster dot pattern are arranged in parallel with each other along the sub-scanning direction. The density of the test chart may be so set as to easily detect a variation in the characteristic of the photoreceptor drum and the amount of laser light. For example, if the image data corresponds to 8 bit (256 tones), the density is set as a level 18 (a density value in the CMYK color space). The test chart may preferably be created for each one of the plurality of density levels (18, 32, 64, 88 and 112, for example). Since the density value is in the CMYK color space here, the density level is increased as the numeric value is larger, possibly making it difficult to distinguish unevenness in density. Thus, the density of the test chart may preferably be at a low level.

FIGS. 5 through 9 illustrate examples of the test charts outputted by the image output apparatus 6 of the digital multi-function peripheral 1 according to Embodiment 1 of the present invention. In each figure, positional information in the main scanning direction indicated by "a" through "f" is also outputted in order for the user to determine the amount of adjustment for each position in the main scanning direction substantially perpendicular to the feed direction of a recording medium by eye observation. The density of an outputted test chart is expressed by, for example, the density of dots. Moreover, for the sake of convenience, an example is shown where the density of the dispersed dot pattern is changed in each of the regions "a" and "b." Though "a" through "f" are used to express the positions, any code which can determine a position may alternatively be used, not limited to the illustrated examples. Furthermore, though the density of a test chart is expressed by the density of dots here, the test chart outputted actually is not limited to the illustrated manner.

Figure 5:
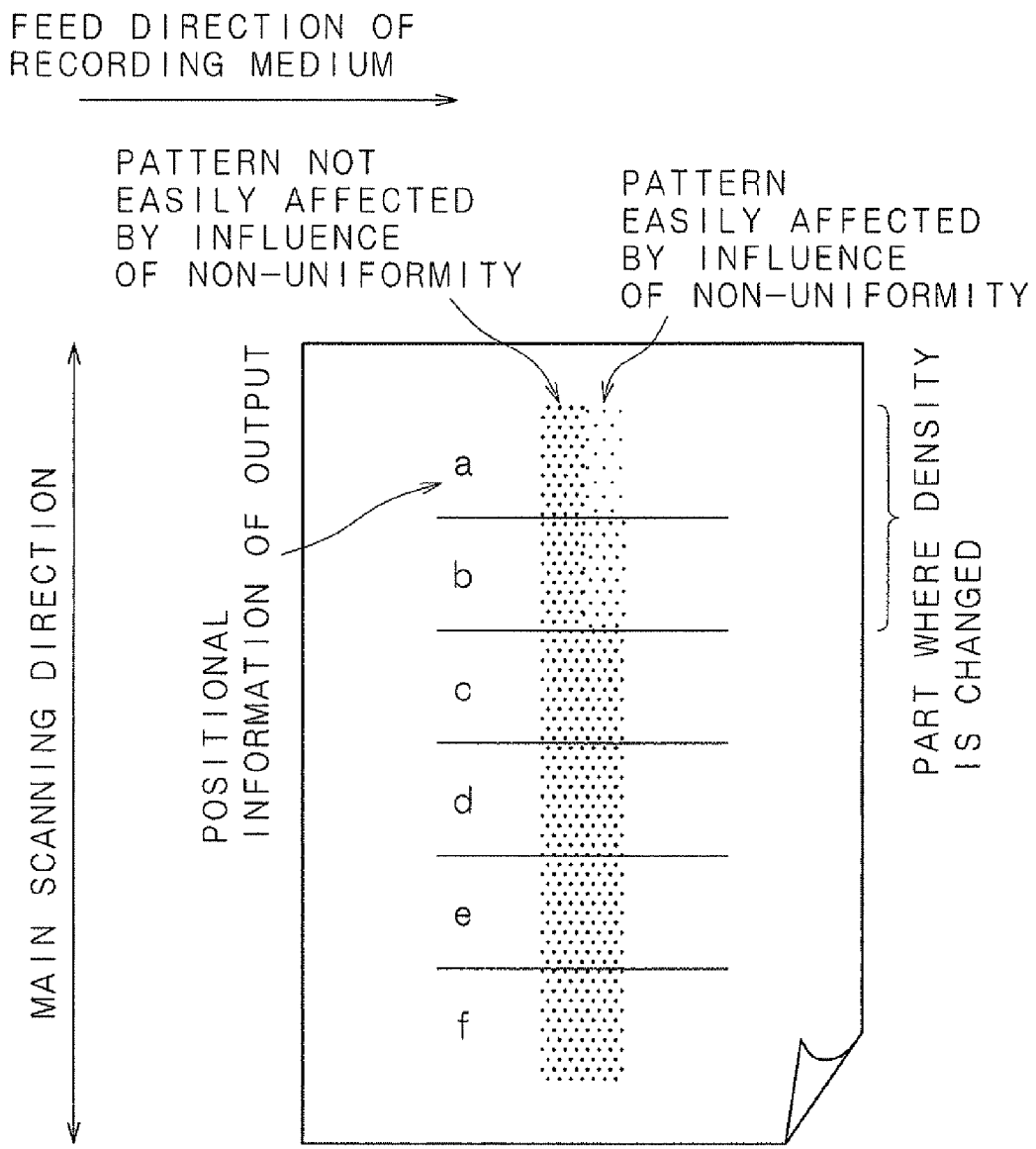
FIG. 5 illustrates an example of a test chart outputted from an image output apparatus in the digital multi-function peripheral according to Embodiment 1 of the present invention.
Figure 6:
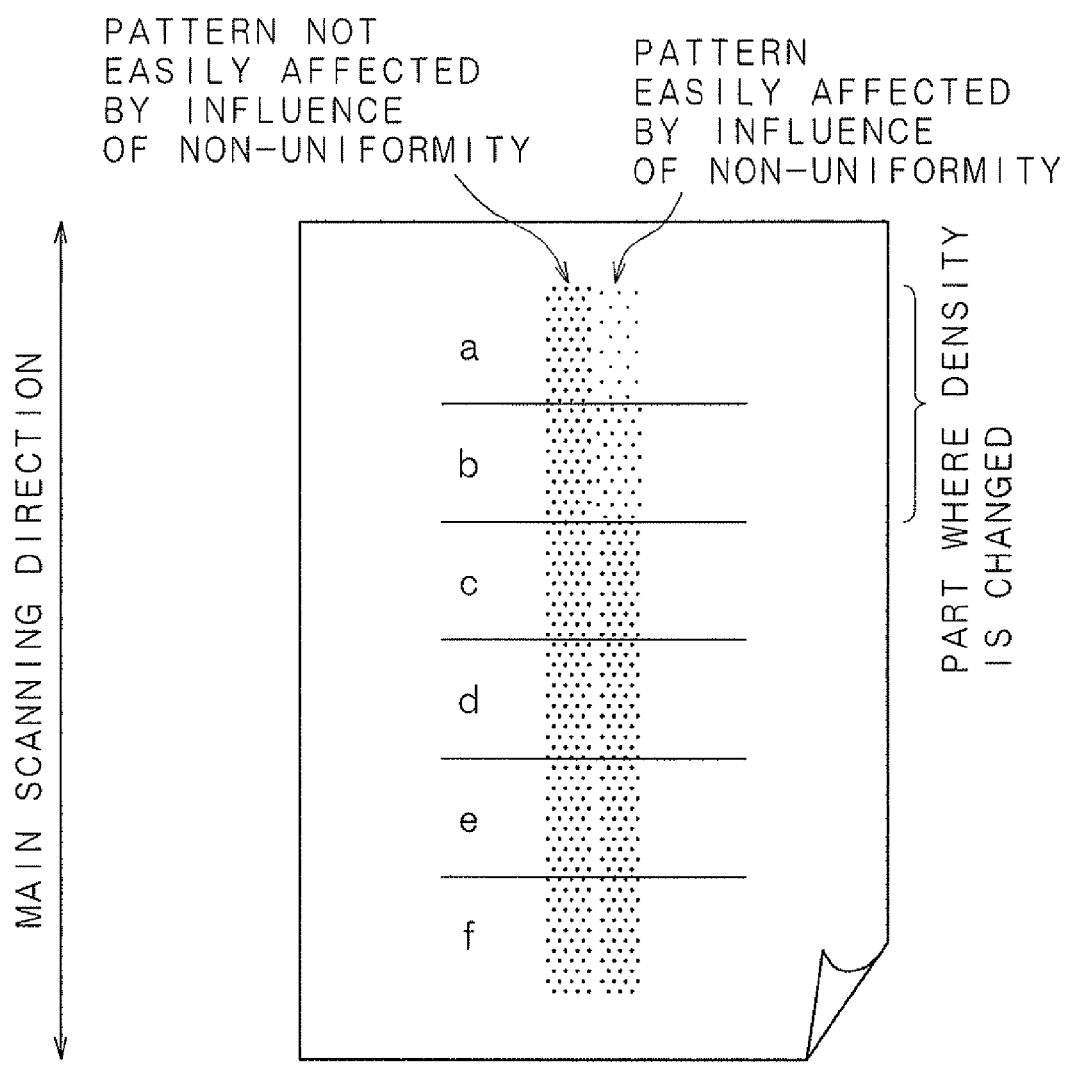
FIG. 6 illustrates an example of a test chart outputted from an image output apparatus in the digital multi-function peripheral according to Embodiment 1 of the present invention.
Figure 7:
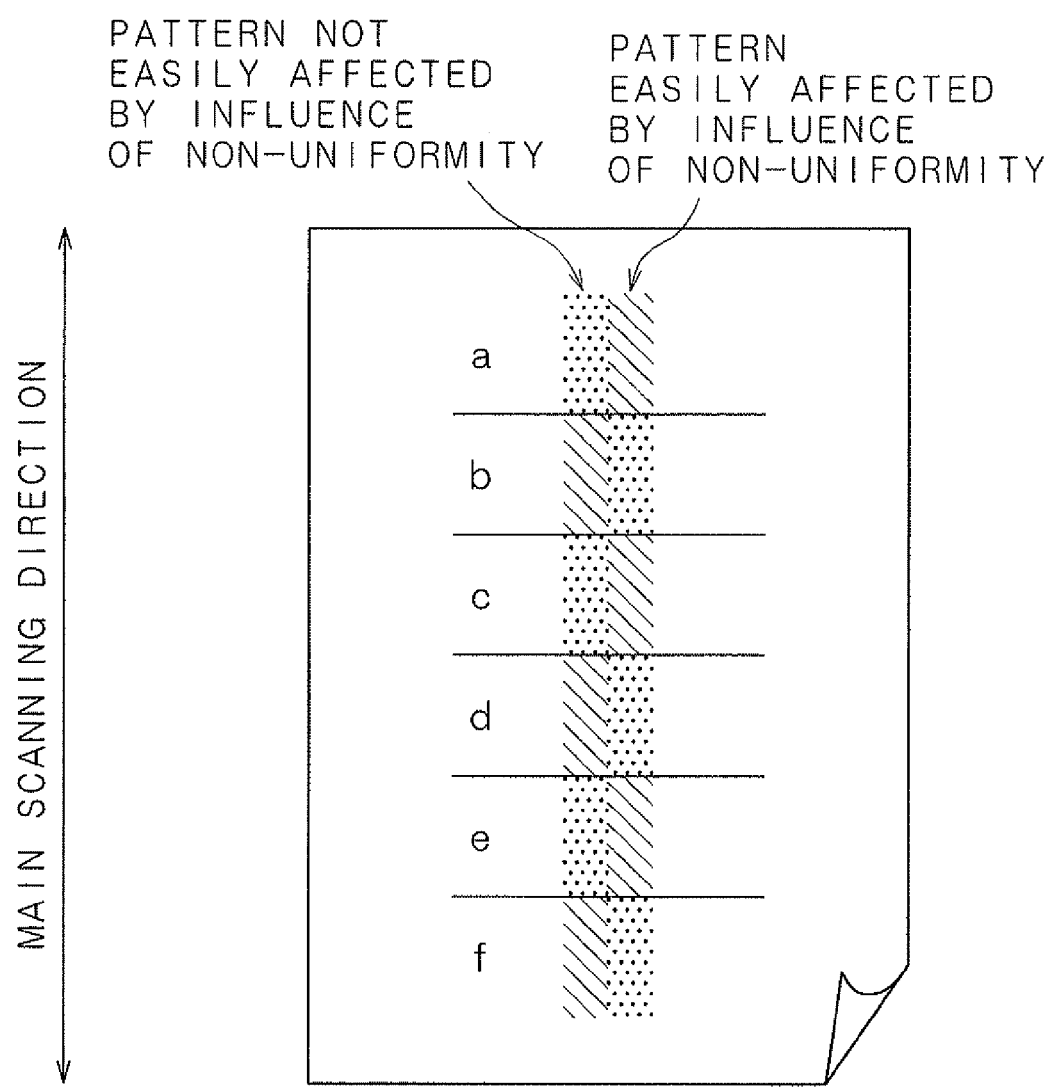
FIG. 7 illustrates an example of a test chart outputted from an image output apparatus in the digital multi-function peripheral according to Embodiment 1 of the present invention.
Figure 8:
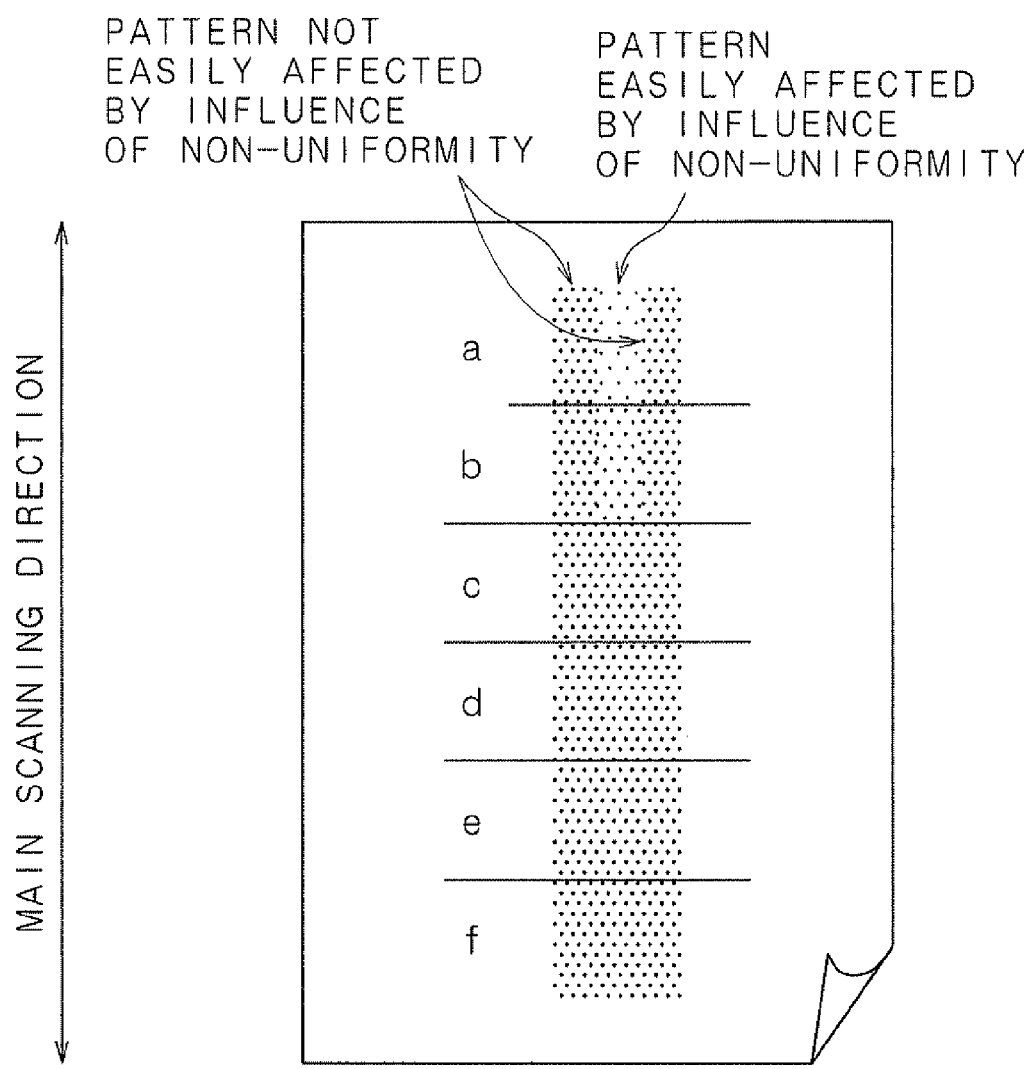
FIG. 8 illustrates an example of a test chart outputted from an image output apparatus in the digital multi-function peripheral according to Embodiment 1 of the present invention.
Figure 9:
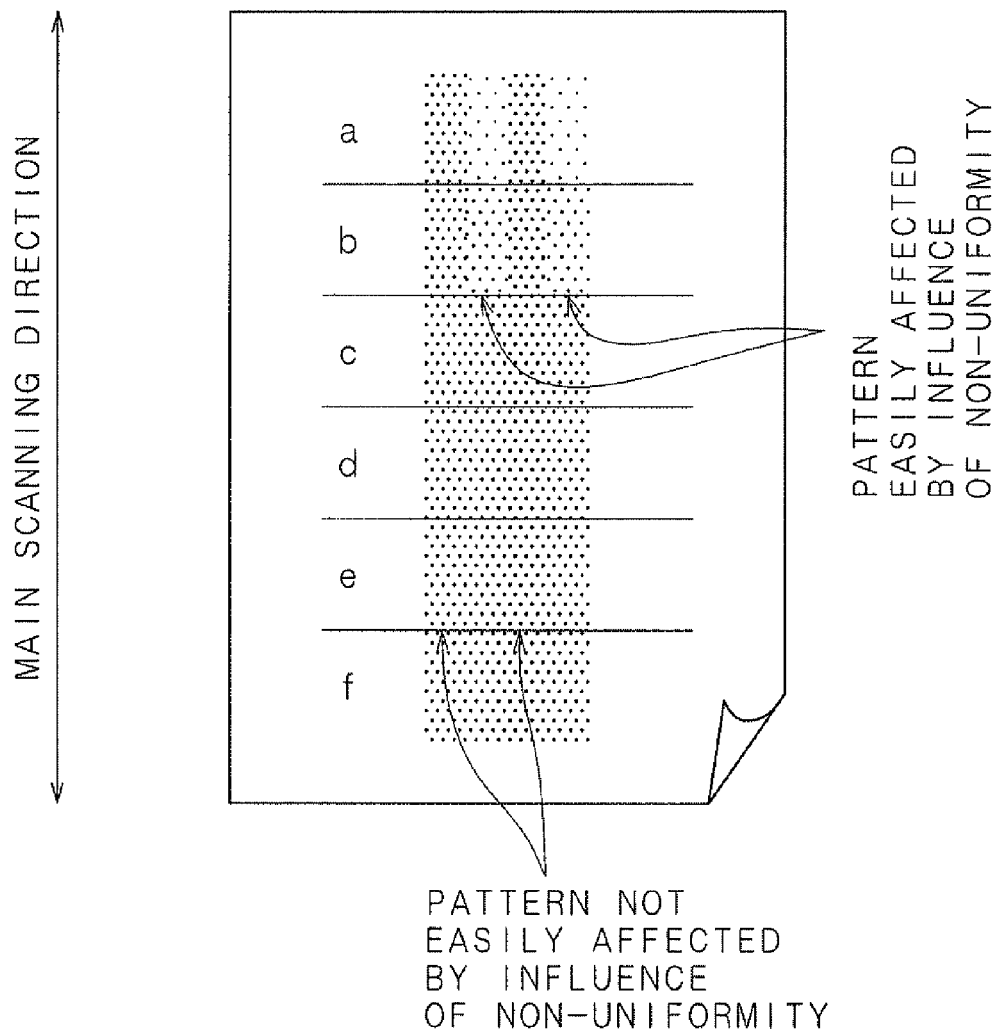
FIG. 9 illustrates an example of a test chart outputted from an image output apparatus in the digital multi-function peripheral according to Embodiment 1 of the present invention.

The dispersed dot pattern and cluster dot pattern may be arranged at any arbitrary positions as long as the user can see unevenness in density by eye observation. For example, FIG. 5 illustrates an example of a test chart in which a dispersed dot pattern and a cluster dot pattern are arranged to be adjacent to each other. FIG. 6 illustrates a test chart in which a dispersed dot pattern is arranged to be a little separated from a cluster dot pattern. FIG. 7 illustrates a test chart in which a dispersed dot pattern and a cluster dot pattern are alternately arranged in the main scanning direction and also in the sub-scanning direction. Here, the dispersed dot pattern is indicated by hatching in order to clearly express the arrangement of the patterns, whereas a variation in density is not expressed. FIG. 8 illustrates a test chart in which cluster dot patterns are arranged in two lines while a dispersed dot pattern is arranged between the two lines. FIG. 9 illustrates a test chart in which two lines of dispersed dot patterns and two lines of cluster dot patterns are alternately arranged in the sub-scanning direction.

The procedure of the adjustment processing for density of an image will specifically be described below. When, for example, the user selects printing of a test chart through the operation device 4, the display device 8 shows a message urging the user's authentication such as an input of a password. The digital multi-function peripheral 1 performs authentication of the user before starting the adjustment processing for the image density.

First, the test chart creating section 22 reads out pre-stored pattern data from the storage device 3, creates test chart data regarding a test chart in which, for example, a dispersed dot pattern and a cluster dot pattern are arranged to be adjacent to each other, and outputs the data to the density adjustment section 21. The density adjustment section 21 adjusts test chart data from the test chart creating section 22 based on the amount of adjustment stored in the storage device 3 and outputs the adjusted data to the image output apparatus 6. Here, every initial value of the amount of adjustment for each position stored in the storage device 3 is set as "0."

Next, the image output apparatus 6 outputs the test chart as illustrated in FIG. 5 based on the test chart data from the density adjustment section 21. As shown in FIG. 5, the difference in density between patterns in the regions "a" and "b" are recognized by eye observation. This allows the user to determine that the density of an image needs to be adjusted in the regions "a" and "b" based on the outputted test chart.

Here, the user gives an instruction to input the amount of adjustment by, for example, the operation device 4.

Figure 10:
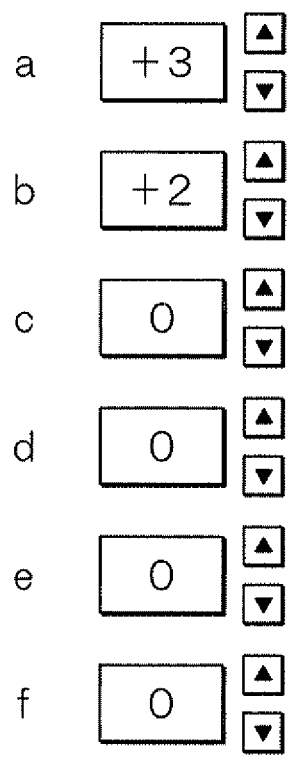
FIG. 10 illustrates an example of a correction amount input screen displayed on a display device in the digital multi-function peripheral according to Embodiment 1 of the present invention.

The adjustment amount input screen is displayed at the display device 8. FIG. 10 illustrates an example of a correction amount input screen displayed on the display device 8 in the digital multi-function peripheral 1 according to Embodiment 1 of the present invention. As illustrated in FIG. 10, on the adjustment amount input screen, an input frame for the amount of adjustment in each of the regions represented by "a" through "f" is set in association with the test chart. That is, the positional information displayed on the adjustment amount input screen used for inputting the amount of adjustment corresponds to the positional information in the test chart. The amount of adjustment can be obtained by, for example, referring to a sample created in advance. More specifically, an image is outputted in advance for each of a plurality of density values, and a sample is created in which a variation in density for the outputted image is associated with the amount of adjustment. The user compares the outputted test chart with the sample, to easily obtain the amount of adjustment.

The user manually inputs the amount of adjustment on the adjustment amount input screen to set the amount of adjustment in the region "a" as "+3" and the amount of adjustment in the region "b" as "+2." Since the difference in density between patterns cannot be seen in the regions "c" through "f," the amount of adjustment is set as "0." When the input of the amount of adjustment is completed, the user can give an instruction for terminating the input of the amount of adjustment by means of, for example, the operation device 4. The input amount of adjustment is accepted by the control device 2, and is added to the amount of adjustment stored in the storage device 3. Accordingly, the amount of adjustment stored in the storage device 3 is updated.

Subsequently, the test chart creating section 22 reads out pattern data again from the storage device 3, creates test chart data and outputs the created data to the density adjustment section 21. The density adjustment section 21 adjusts the density for the test chart data from the test chart creating section 2 based on the amount of adjustment stored in the storage device 3, and outputs the result to the image output apparatus 6. The image output apparatus 6 outputs a test chart based on the adjusted test chart data.

The user determines whether or not there is a difference in density between patterns in the outputted test chart by eye observation. When it is determined that there is a difference in density, the processing as described above, such as inputting and updating of the amount of adjustment, adjusting and outputting of the test chart data, are performed again, and such processing is repeated until the difference in density between patterns in the outputted test chart disappears. When it is determined that there is no difference in density between patterns, the user can give an instruction for terminating adjustment using, for example, the operation device 4. In response to the user's instruction, the processing of adjusting the image density is terminated.

When, for example, the image output apparatus 6 is to output the image read by the image reading apparatus 5, the density adjustment section 21 adjusts the image data processed by the halftone generating section 20 based on the amount of adjustment stored in the storage device 3. Thus, an image without unevenness in density is outputted by the image output apparatus 6.

Figure 11:
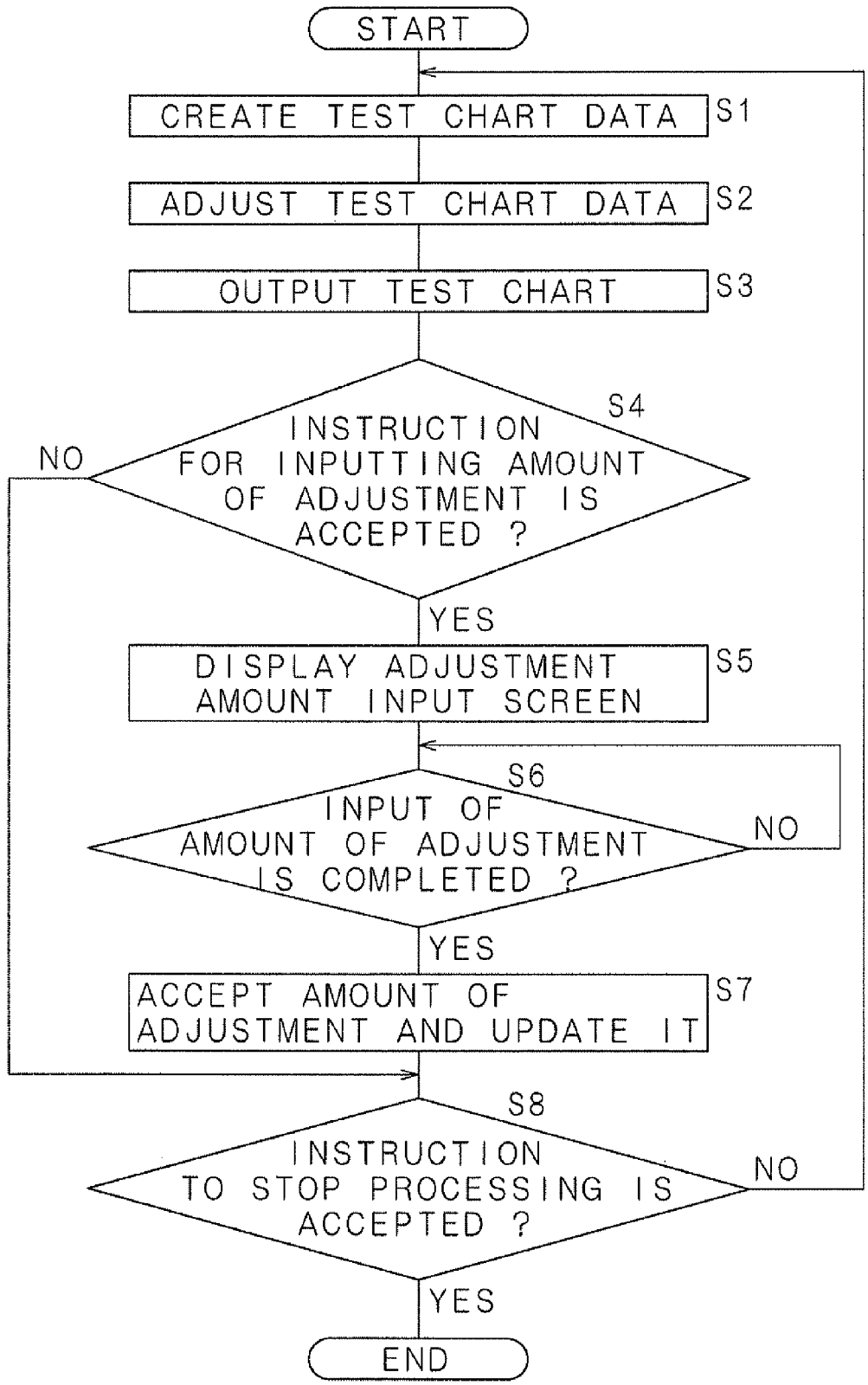
FIG. 11 is a flowchart illustrating a processing procedure performed by a control device in the digital multi-function peripheral according to Embodiment 1 of the present invention.

FIG. 11 is a flowchart illustrating a processing procedure performed by the control device 2 in the digital multi-function peripheral 1 according to Embodiment 1 of the present invention. As illustrated in FIG. 11, the control device 2 instructs the test chart creating section 22 to create test chart data (step S1). The test chart creating section 22 reads out pattern data stored in the storage device 3 in accordance with an instruction by the control device 2, creates the test chart data and outputs it to the density adjustment section 21.

The control device 2 instructs the density adjustment section 21 to adjust test chart data (step S2). The density adjustment section 21 adjusts the test chart data from the test chart creating section 22 based on the amount of adjustment stored in the storage device 3. As described above, when adjustment of the test chart data is started, every initial value of the amount of adjustment for each position stored in the storage device 3 is set as "0."

The control device 2 instructs the image output apparatus 6 to output the adjusted test chart (step S3). The image output apparatus 6 outputs a test chart based on the adjusted test chart data received from the density adjustment section 21 in response to the instruction by the control device 2.

The control device 2 determines whether or not the user's instruction for inputting the amount of adjustment is accepted (step S4), and if it determined that the instruction for inputting the amount of adjustment is not accepted (step S4: NO), proceeds to step S8.

If it is determined that the instruction for inputting the amount of adjustment is accepted (step S4: YES), the control device 2 instructs the display device 8 to display the adjustment amount input screen (step S5). The display device 8 displays the adjustment amount input screen in accordance with an instruction given by the control device 2.

The control device 2 determines whether or not the input of the amount of adjustment by the user is completed (step S6). If it is determined that the input of the amount of adjustment is not completed (step S6: NO), the determination is repeated until the input of the amount of adjustment is completed.

If it is determined that the input of the amount of adjustment is completed (step S6: YES), the control device 2 accepts the input amount of adjustment, and updates the amount of adjustment based on the amount of adjustment stored in the storage device 3 and the accepted amount of adjustment (step S7).

The control device 2 determines whether or not an instruction by the user to stop the processing is accepted (step S8). If it is determined that the instruction to stop the processing is not accepted (step S8: NO), the processing is returned to step S1 to repeat the operation at each step. If it is determined that the instruction to stop the processing is accepted (step S8: YES), the processing is terminated.

In the present embodiment, a test chart is outputted, including a plurality of patterns in which at least one pattern is more easily affected by a variation factor for density than another pattern, the amount of adjustment obtained by eye observation from the outputted test chart is inputted to the adjustment amount input screen, and the density of the test chart to be outputted again is adjusted based on the inputted amount of adjustment. The operations described above are repeated until the difference in density between patterns in the outputted test chart disappears, so that non-uniformity in density can easily be detected while the amount of adjustment for density can be obtained without the use of a complicated device such as a device for colorimetry. Moreover, an image with uniform density can easily be outputted by adjusting the density of the image to be outputted from the image output apparatus 6, based on thus obtained amount of adjustment for density.

(Variation 1)

Figure 12A:
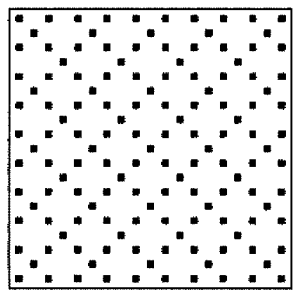
FIG. 12A illustrates an example of a pattern configuring a test chart used in a digital multi-function peripheral according to Variation 1 of the present invention.
Figure 12B:
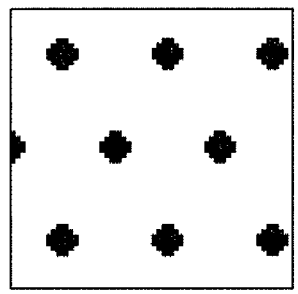
FIG. 12B illustrates an example of a pattern configuring a test chart used in the digital multi-function peripheral according to Variation 1 of the present invention.
Figure 12C:
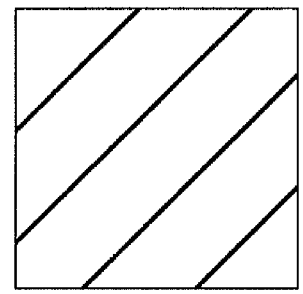
FIG. 12C illustrates an example of a pattern configuring a test chart used in the digital multi-function peripheral according to Variation 1 of the present invention.

Variation 1 is an example of a test chart including three types of patterns. FIGS. 12A, 12B and 12C illustrate examples of patterns included in a test chart used in the digital multi-function peripheral 1 according to Variation 1 of the present invention. FIGS. 12A and 12B respectively illustrate a dispersed dot pattern which is easily affected by a variation factor for density and a cluster dot pattern which is not easily affected by a variation factor of density as in FIGS. 4A and 4B, while FIG. 12C illustrates a line screen pattern which is not easily affected by a variation factor for density.

FIG. 13 illustrates an example of a test chart outputted from the image output apparatus 6 in the digital multi-function peripheral 1 according to Variation 1 of the present invention. The test chart includes a dispersed dot pattern, a cluster dot pattern and a line screen pattern, for which the density appears to be uniform. The test chart is configured as, for example, a band pattern, the entire part of which extends in the main scanning direction, formed with these three type of patterns aligned in parallel with each other in the sub-scanning direction in the order of the cluster dot pattern, dispersed dot pattern and line screen pattern. In FIG. 13, the cluster dot pattern, dispersed dot pattern and line screen pattern are indicated as a pattern 1, a pattern 2 and a patter 3, respectively, while the density of the three types of patterns are all expressed by the density of dots.

Though, in Variation 1, an example where the pattern easily affected by a variation factor for density is formed only with the dispersed dot dither pattern, it is not limited thereto. The pattern easily affected by a variation factor for density may include the dispersed dot dither pattern and/or the error diffusion pattern. Furthermore, the pattern not easily affected by a variation factor for density may employ only one of the cluster dot dither pattern and the line screen pattern.

According to Variation 1, the test chart including three types of patterns is used, so that the difference in density between patterns can even more easily be determined by eye observation, while an amount of adjustment for density can rapidly be obtained.

(Variation 2)

Figure 14:
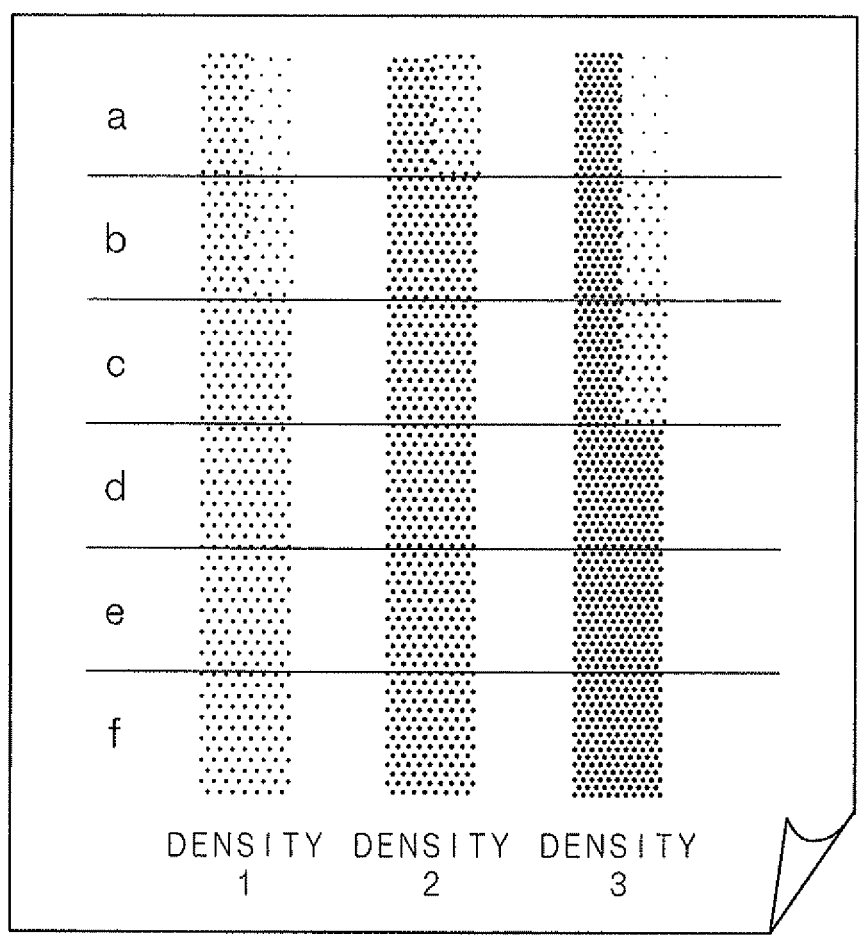
FIG. 14 illustrates an example of a test chart outputted from an image output apparatus in a digital multi-function peripheral according to Variation 2 of the present invention.

Variation 2 is an example where a plurality of test charts with different levels of density is outputted to one sheet of a recording medium to obtain an amount of adjustment for each density. FIG. 14 illustrates an example of a test chart outputted from the image output apparatus 6 in the digital multi-function peripheral 1 according to Variation 2 of the present invention. As illustrated in FIG. 14, three test charts each having different density levels (represented as density 1, density 2 and density 3) are formed on one sheet of a recording medium. Each test chart with each density includes, for example, a dispersed dot pattern and a cluster dot pattern. With reference to FIG. 14, it is determined that the test chart with the density 1 has a difference in density between patterns in the regions "a" and "b," the test chart with the density 2 has a difference in density between patterns in the region "a," and the test chart with the density 3 has a difference in density between patterns in the regions "a," "b" and FIG. 15 illustrates an example of a correction amount input screen displayed on the display device 8 in the digital multi-function peripheral 1 according to Variation 2 of the present invention. On the adjustment amount input screen illustrated in FIG. 15, inputted frames are shown, each of which is for an amount of adjustment for each density and each position in association with a test chart. The user refers to a sample to obtain an amount of adjustment for the position having a difference in density. When the user inputs the obtained amount of adjustment to a corresponding input frame, the density can easily be adjusted by an appropriate amount of adjustment based on the density of an image to be outputted.

Though, in Variation 2, an example is described where the test chart for each density includes a dispersed dot pattern and a cluster dot pattern, it is not limited thereto. An arbitrary test chart described above may also be employed.

Embodiment 2

Figure 16:
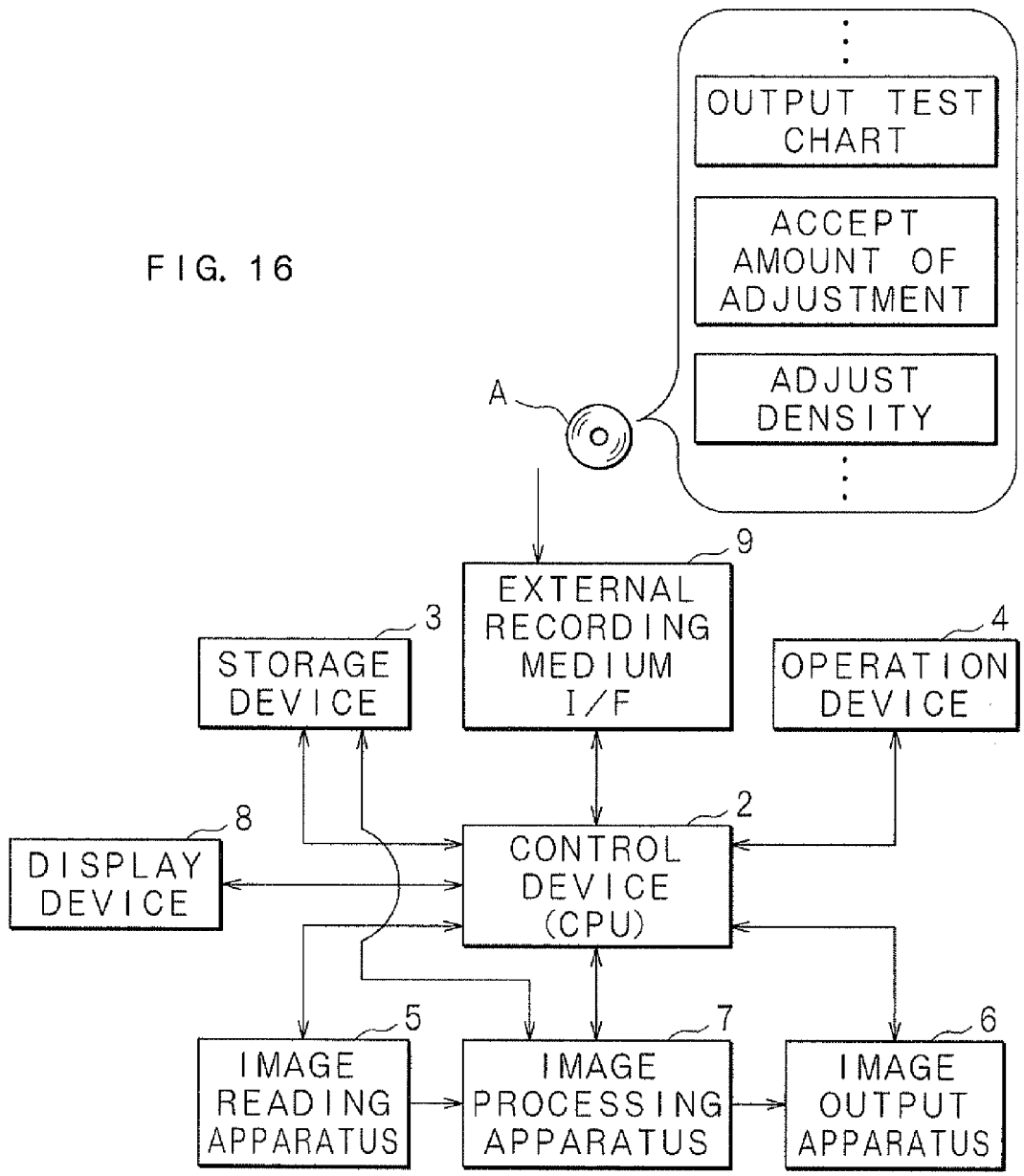
FIG. 16 is a block diagram illustrating substantial components of a digital multi-function peripheral according to Embodiment 2 of the present invention.

FIG. 16 is a block diagram illustrating substantial components of the digital multi-function peripheral 1 according to Embodiment 2 of the present invention. The digital multi-function peripheral 1 according to Embodiment 2 is so configured that a program for performing an operation can also be offered by a portable recording medium A such as a CD-ROM through an external recording medium I/F 9. Furthermore, the digital multi-function peripheral 1 according to Embodiment 2 is configured such that the computer program can be downloaded thereto from an external device (not shown). This will be described in detail below.

The digital multi-function peripheral 1 according to Embodiment 2 is provided with an external (or internal) recording medium reading device (not shown). The portable recording medium A, in which a program and the like is recorded that causes the test chart creating section 22 to create test chart data, causes the density adjustment section 21 to adjust test chart data, causes the image output apparatus 6 to output the adjusted test chart, and that helps to accept an input amount of adjustment and to adjust the density based on the amount of adjustment, is inserted into the recording medium reading device to install the program in, for example, the storage device 3. The program is loaded to a RAM (not shown) of the control device 2 to be executed. This allows the digital multi-function peripheral 1 to function as the image forming apparatus according to Embodiment 1.

As the recording medium described above, a memory (not shown) such as a ROM itself may be a program medium for example, since the processing is performed in a microcomputer, or a medium carrying a program code in a fixed manner including a tape system such as a magnetic tape and a cassette tape, a disk system such as a magnetic disk including a flexible disk and a hard disk as well as an optical disk including a CD-ROM, a MO, a MD and a DVD, a card system such as an IC card (including a memory card) and an optical card, or a semiconductor memory such as a mask ROM, an EPROM, an EEPROM and a flash ROM.

The recording medium may also be a medium carrying a program code in a flowing manner, for example, by downloading such a program code from a communication network through a communication device (not shown). In the case where a program is downloaded from the communication network as described above, the program for downloading may be pre-stored in the apparatus or may be installed from another recording medium. Note that the present invention may be realized in a form of a computer data signal embedded in a carrier wave, which is embodied from by electric transmission.

While an example is described where the density adjustment section 21 is provided in the image processing apparatus 7 to adjust the density for image data to be outputted, the adjustment of density is not limited thereto. The density adjustment section 21 may also be provided in the image output apparatus 6, and parameters related to density, such as the width of a pulse for driving laser light of the image output apparatus 6 and an output of the laser light, may be adjusted to adjust the density.

Moreover, though an example where a test chart extending as a whole in the main direction and including a plurality of patterns aligned in parallel with each other in the sub-scanning direction is used to detect non-uniformity in density based on a position in the main scanning direction and to adjust the density, the adjustment of density is not limited thereto. A test chart extending along the sub-scanning direction and including a plurality of patterns aligned with each other in the main scanning direction may also be used to detect non-uniformity in density based on a position in the sub-scanning direction and to adjust the density.

While the embodiment illustrated above is described for the case where the test chart data is created by the test chart creating section 22, it is not limited thereto. The test chart data may be pre-stored in the storage device 3 and may be read out therefrom when the test chart is to be outputted.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image forming apparatus, comprising:
an image forming section for forming a test image including a plurality of patterns intended to have a same density as each other, in which at least one of the patterns is more easily affected by a variation factor for density than another one of the patterns;
an accepting section for accepting an amount of adjustment for density based on a difference in density of the formed patterns; and
an adjusting section for adjusting density of an image to be formed by the image forming section based on the amount of adjustment for density accepted by the accepting section.

2. The image forming apparatus according to claim 1, wherein said at least one pattern is a dispersed dot dither pattern or an error diffusion pattern, and
said another pattern is at least one of a cluster dot dither pattern and a line screen pattern.

3. The image forming apparatus according to claim 2, wherein the adjusting section adjusts density such that a difference in density between patterns in the formed test image becomes smaller.

4. The image forming apparatus according to claim 1, wherein the adjusting section adjusts density such that a difference in density between patterns in the formed test image becomes smaller.

5. The image forming apparatus according to claim 1, wherein
said at least one pattern is a pattern that easily detects a variation factor for density than said another patterns.

6. The image forming apparatus according to claim 1, wherein
the test image is formed with at least a pattern that is easily affected by a variation factor for density and a pattern that is not easily affected by a variation factor for density.

7. The image forming apparatus according to claim 1, wherein
the test image is formed in such a manner that a pattern that is easily affected by a variation factor for density and a pattern that is not easily affected by a variation factor for density are arranged in parallel with each other in a sub-scanning direction, and also each of the patterns extend along a main scanning direction.

8. The image forming apparatus according to claim 1, wherein the test image is formed with a plurality of patterns in which at least a pattern that is easily affected by a variation factor for density and a pattern that is not easily affected by a variation factor for density are alternately arranged in a main scanning direction, and in the plurality of patterns, said pattern that is easily affected by a variation factor for density and said pattern that is not easily affected by a variation factor for density are also alternately arranged in a sub-scanning direction.

9. An image forming method, comprising:

an image forming step of forming a test image including a plurality of patterns intended to have a same density as each other, in which at least one of the patterns is more easily affected by a variation factor for density than another one of the patterns;

an accepting step of accepting an amount of adjustment for density based on a difference in density of the formed patterns; and an adjusting step of adjusting density of an image to be formed based on the accepted amount of adjustment for density.

10. The image forming method according to claim 9, wherein the adjusting step adjusts density such that a difference in density between patterns in the formed test image becomes smaller.

11. The image forming method according to claim 9, wherein said at least one pattern is a dispersed dot dither pattern or an error diffusion pattern, and said another pattern is at least one of a cluster dot dither pattern and a line screen pattern.

12. The image forming method according to claim 9, wherein the test image is formed with at least a pattern that is easily affected by a variation factor for density and a pattern that is not easily affected by a variation factor for density.

13. The image forming method according to claim 9, wherein the test image is formed in such a manner that a pattern that is easily affected by a variation factor for density and a pattern that is not easily affected by a variation factor for density are arranged in parallel with each other in a sub-scanning direction, and also each of the patterns extend along a main scanning direction.

14. The image forming method according to claim 9, wherein the test image is formed with a plurality of patterns in which at least a pattern that is easily affected by a variation factor for density and a pattern that is not easily affected by a variation factor for density are alternately arranged in a main scanning direction, and in the plurality of patterns, said pattern that is easily affected by a variation factor for density and said pattern that is not easily affected by a variation factor for density are also alternately arranged in a sub-scanning direction.

15. A non-transitory recording medium recording a computer program in a computer, said computer program comprising the steps of:

causing a computer to form a test image including a plurality of patterns intended to have a same density as each other, in which at least one of the patterns is more easily affected by a variation factor for density than another one of the patterns;

causing the computer to accept an amount of adjustment for density based on a difference in density of the formed patterns; and causing the computer to adjust density of an image to be formed based on the accepted amount of adjustment for density.

* * * * *